Figure 5:
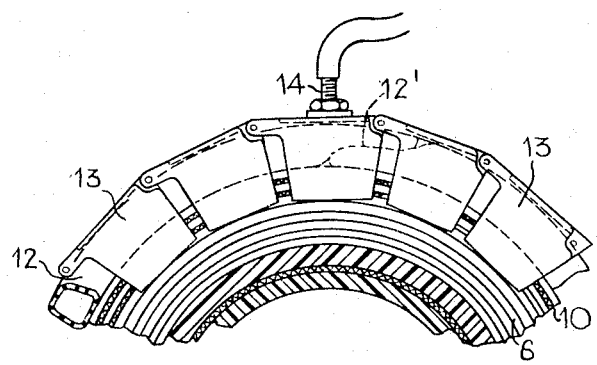

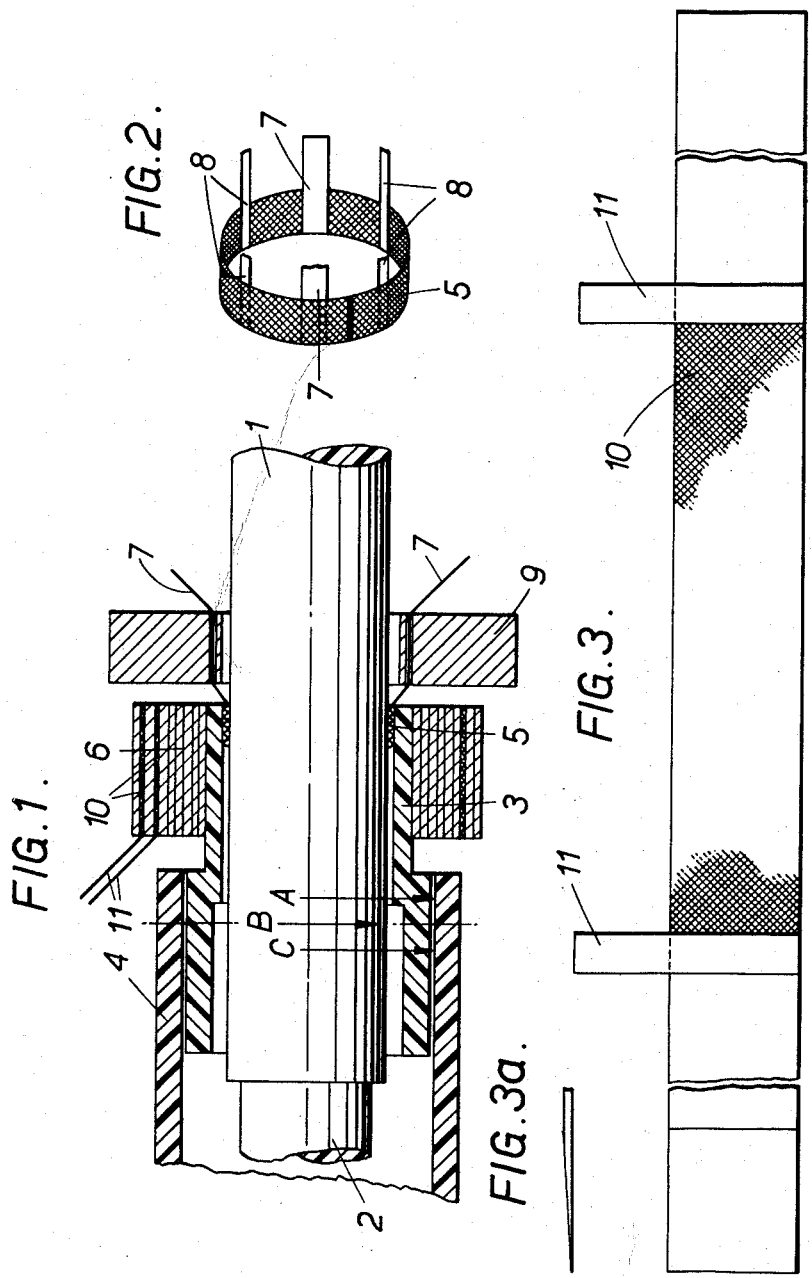

May 19, 1964    R. W. GANDY    3,133,846
METHOD OF MAKING A THERMOPLASTIC JOINT

Filed May 21, 1962    2 Sheets-Sheet 2

United States Patent Office 3,133,846
Patented May 19, 1964

3,133,846
METHOD OF MAKING A THERMOPLASTIC JOINT
Robert William Gandy, Welling, Kent, England, assignor to Telephone Cables Limited, Essex, England, a British company
Filed May 21, 1962, Ser. No. 197,191
Claims priority, application Great Britain May 24, 1961
11 Claims. (Cl. 156—49)

This invention relates to the making of joints between members of thermoplastic material, with important but non-exclusive application in connection with the jointing of electric cables sheathed in such thermoplastic material and especially in polythene.

It is known to join members of thermoplastic material by providing between the surfaces to be joined, or embedded in one of these surfaces, an electric heater which on being supplied with electric current fuses the material at the interface so that on cooling a joint is formed with the heater left embedded in it.

While a joint formed in this way can be satisfactory as regards its strength and may in some respects be reinforced by the embedded heater, it has been found that the presence of the heater can give rise to certain undesirable effects, in particular that it can present a source of weakness in the joint under repeated flexing, and that the joint may not be a true weld except over a relatively small area lying just beyond the edge of the area occupied by the heater. This latter effect is especially marked where, as in the case of polythene, the thermoplastic material does not readily bond with the material, usually metal, from which the heater is made. For the same reason, and because connections to the heater must somewhere come to the outside surface of the joint even although they may be cut off close to the surface, there is a tendency for the joint to absorb moisture by capillary action between the heater surface and the thermoplastic material embedding it: in the case of a transparent or translucent thermoplastic material this can be demonstrated by immersing the joint in a coloured fluid and observing the discoloration which takes place within the joint.

According to the present invention, a joint between facing surfaces of two members of thermoplastic material is made by interposing an electric heater of coherent openwork form between the two surfaces, fusing the material at the interface between said two surfaces by means of said heater, and withdrawing said heater with a motion which is agitated during at least an early part of the withdrawing action, this agitation being imparted to the fused material at the interface so as to lead to an intimate weld between the two members on cooling of the joint after the withdrawal of the heater. Prior to the fusion step heat and pressure may be applied so as to soften the material, without fusing it, and to press the surfaces into intimate contact with the heater.

By a coherent open-work heater is meant a heating element which has interstices or other such openings through which the fused material is able to pass and which has its constituent parts so inter-related and inter-connected, as in the case for instance of woven or expanded metal mesh or of perforated sheet, that the heater can be withdrawn as a whole. For a joint between overlapping circumferential surfaces, as would be required for a cable joint made in a manner to be more fully described later, the heater would preferably be in the form of an annular strip of metal mesh cut or formed on the bias so that it is to some extent expandible and can therefore be fitted closely on to the inner of the two surfaces. The agitation of the heater after fusion of the material at the interface may be thought of as giving a kind of nutmeg-grater action but need not be rapid or of large magnitude: a gentle to-and-fro motion repeated a few times and of an amplitude commensurate with the size of the interstices and intervening lands in the heater is likely to be adequate. It will be appreciated that this joining method requires the members being joined to be of substantial thickness normal to the interface in order that the surface fusion will only be local and that for the remainder of their thickness the members, although soft, will retain their shape.

In addition to largely avoiding the disadvantages referred to of the prior methods, the withdrawal of the heater in the method according to the invention has the additional result of tending to remove oxidation products or other contamination of the interface such as may have resulted from the heating of the thermoplastic material to its fusion temperature.

For applying initial heat and pressure externally there may be used in the case of a joint between facing cylindrical or other circumferential surfaces a combined heating and pressure applying device comprising a tape of elastic material capable of withstanding the heating temperatures and having secured to it a length of mesh material cut or formed on the bias and constituting a heating element. This tape can be wrapped round the joint under tension, thereby applying an even radial pressure, and the position of the mesh heater on the tape can be so chosen that the number of turns of wrapped tape between the heater and the outer surface at the joint will be such as to provide between them a predetermined thickness of the tape material and therefore a predetermined temperature drop, so that for a given temperature of the heater a predetermined surface temperature will be obtained. It will be appreciated that this form of heater may be generally useful in circumstances calling for externally applied heat and pressure, as for instance in certain joining procedures relying on chemical action rather than on fusion. The intervention of some layers of tape between the heater and the heated surface also helps to even out the heat distribution at the surface. The initial external heat may be supplemented by a heater on the outside of the tape, and such heater may as an alternative supply all the external heat, dispensing with the tape heater and using the elastic tape for pressure application only.

Instead of or in addition to the application of pressure by means of elastic tape under tension it is contemplated that pressure may be applied externally by mechanical or pneumatic means. This mode of pressure application, used without pressure application by the tape, may be more suitable in the case of a joint between facing cylindrical surfaces of relatively large radius (as required for instance in the jointing of thermoplastically sheathed cables in the upper range of cable diameters) because of the long length of tape which would otherwise have to be wound on under tension. Pneumatic pressure application by means of an inflated pad or tube is preferred because of the ability of such means to adapt itself to irregularities and differences of size and also because the pressure can be controlled at will and if desired can be varied during the formation of the joint.

The invention may be more readily understood from the following description, given with reference to the accompanying drawings, of the formation of a joint between polythene sheathed cables using the method of the invention.

Figure 4:
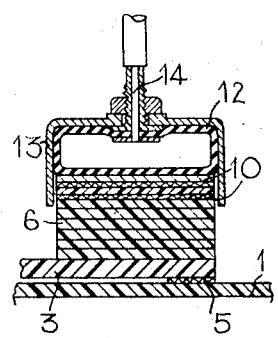

FIG. 1 of the drawing illustrates an end of the cable equipped ready for jointing a polythene collar to the polythene sheath of the cable, this collar receiving a polythene sleeve which is subsequently jointed to it by a similar method, FIG. 2 illustrates a form of withdrawable heater for the interface fusion, FIG. 3 illustrates a form of tape heater such as has been already referred to for applying the necessary external heat and pressure, FIG. 3a being a fragmentary side view of an end of the tape, FIG. 4 is a fragmentary sectional view of part of FIG. 1 showing a modification for application of pressure by pneumatic means, and FIG. 5 is an end view of the parts shown in FIG. 4.

In making a joint between two lengths of polythene sheathed cable, the sheath is cut-back from the ends to expose the cable conductor or conductors, which may be separately insulated with paper or plastic insulation which would also be stripped back. After joining the conductors and separately insulating them, a polythene sleeve previously applied over the cable and now slipped over the joint is fixed to the cable sheath in a water-tight manner. As the overall diameter of the conductor joint may be bigger than that of the original conductor(s), this polythene sleeve may require to be correspondingly greater in its inside diameter than is the polythene cable sheath. Accordingly reducing collars, also of polythene, may be provided for each end of the sleeve, joints being made between the sleeve and the collars and between the collars and the polythene sheaths of the joined cable lengths.

In FIG. 1, which represents one end of a cable joint, the other end being similar, the polythene cable sheath is represented at 1, the cable conductors at 2, a polythene reducing collar at 3, and a polythene sleeve, which covers the conductor joint (not shown) at 4.

For joining the collar 3 to the cable sheath 1 an annular open-work heater 5 surrounding the sheath is interposed between it and the collar, and a heating and compressing tape 6 is applied under tension around the outside of the collar. As shown in FIG. 2 the heater 5 can take the form of a mesh strip of some resistance material, preferably stainless steel, cut on the bias and formed into a ring having an unstretched diameter slightly less than the outer diameter of the cable sheath. The mesh ring circumferentially expanded and applied to the sheath, will therefore firmly engage the outer periphery of the sheath. The heater 5 has connecting leads 7, which may be metal strips welded, soldered or brazed to the mesh, and also support strips or pins 8. A carrier 9 which freely surrounds the cable sheath 1 carries the heater 5 by means of its strips or pins 8 in conjunction with its leads 7, the strips or pins 8 being for example bent over the outer face of the carrier 9.

The external heating and compression tape 6 may take the form of a length of neoprene or silastomer tape (see FIG. 3) having secured to it a heater 10 constituted by a length of bias-cut mesh of resistance metal which again may be stainless steel. Connecting leads 11 extend beyond the edge of the tape to permit connection to the heater 10 when the tape is bound on to the outside of the collar 3 in the manner indicated in FIG. 1. The position of the heater 10 along the tape 6 is so chosen that, in binding on the tape, several layers of it have been applied before the heater is reached, giving the results previously indicated. The length of the heater 10 is so chosen that, at the diameter at which it is applied, it surrounds the collar 3 with some overlap, although this is not essential because the intervening turns of the tape will act so as to tend to give an even distribution of heat at the outside of the collar 3. The inner end of the tape 6 is preferably tapered as indicated in FIG. 3 in order to minimise marking of the outside of the collar 3 by the end of the tape when the collar is soft and under pressure.

To make the joint, current is first passed through the heater 10 to heat the end of the collar 3 to a temperature at which it is soft but not molten, a temperature of between 60 and 85° C. being envisaged as being suitable. The pressure applied by the tape 6 presses the soft collar into intimate engagement with the heater 5 and the latter into intimate engagement with the outside of the sheath 1. If, because of manufacturing tolerances, the space between the collar 3 and the sheath 1 at the position of the joint is somewhat greater than ideal (the ideal space being just sufficient to accommodate the thickness of the heater 5), the extra space may be taken up by polythene tape (not shown) bound over or under the heater 5 before the collar 3 is applied over it.

After the pre-softening step, which may typically take some 8 minutes for the temperature indicated, current is passed through the interface heater 5 which brings the material at the interface up to fusing temperature, typically between 150 and 180° C. After a time long enough to obtain the required melting of the material but without excessive penetration through the thickness of the collar, which time may be of the order of 60 seconds with a heater loading of about 6 watts per cm.$^2$, the heater is started to be withdrawn along the cable, being also moved angularly to and fro sufficiently to agitate the fused material at the interface. The withdrawal of the heater 5, rather than being effected in a direction parallel to the cable axis, preferably combines angular with progressive axial movement in order to avoid the formation of striations within the joint. As the heater 5 is withdrawn the pressure applied by the tape 6 ensures that any space left by the heater between the collar 3 and the sheath 1 is taken up. On completion of withdrawal of the heater 5 the joint is allowed to cool, still under pressure from the tape 6, which is subsequently removed. The heater 5 is expendable and can simply be cut from the cable: the carrier 9 can be of a split design to enable it to be removed for future use.

With the collar 3 joined to the cable sheath 1 as just described, the sleeve 4 can be joined to the collar in a similar fashion. If this is done at A, there is the possibility of opening the joint at a later date by cutting at B, removing the excess material left at A as by filing or trimming, and reclosing the joint with a new fused joint between the collar 3 and the new shorter sleeve 4 at C, using the procedure already described. In the event that the conductor joint has not been broken an interface heater of split form can be used so that it can be placed round the collar 3. Opening and reclosing of the joint in the manner indicated may be repeated.

In making the joint between the collar 3 and the cable sheath 1 the heater 5 could possibly be withdrawn in the opposite direction, namely through the collar 3. This could reduce the flashing which might otherwise arise at the cable end of the collar.

Under certain conditions such as small size cables or when the fit between the collar and cable sheath is ideal, external heating may be dispensed with and the pre-heating and softening of the material may be obtained by means of the interface heater run for an initial period at a reduced current.

In making a joint of large diameter in the manner described with reference to FIG. 1 the requirement of winding on the necessarily long length of tape 6 under tension, particularly in view of the desirability of keeping the tension substantially constant, tends to be onerous. As a modification of the method the tape 6 with its heater 10 can be wound on without significant tension and pressure applied externally thereof, the tape then acting as a pressure transferring means. In FIGS. 4 and 5, which illustrate such a modification, a closed pneumatic tube 12, having a generally rectangular cross-section and made of a pliable material such as rubber or neoprene, is applied round the outside of the wound-on tape 6 and is constrained against outwards or sideways expansion by constraining members 13 applied over it. The members 13 are shown as being of generally U-shape cross-section connected together in articulated fashion. One particular mode of articulation is shown in FIG. 5 but other possible modes can be readily envisaged. The pneumatic tube 12, to which pneumatic pressure can be admitted through an inlet port 14, is of such length that its ends overlap as indicated at 12', thereby ensuring that the pressure is applied around the entire periphery. The extent of overlap is immaterial (because the same pressure will be applied at the overlap as at non-overlapped positions) and it is therefore possible to use a tube 12 of given length for joints of different diameters. Pressure admitted to the tube 12 acts through the wound-on tape 6 so that in the manner previously described the facing surfaces of the parts to be joined (parts 3 and 5) are pressed in intimate contact with the heater 5 between them.

What I claim is:

1. A method of making a joint between facing surfaces of two members of thermoplastic material, comprising the steps of interposing an electric heater of coherent open-work form between the two surfaces, fusing the material at the interface between said two surfaces by means of said heater, and withdrawing said heater with a motion which is agitated during at least an early part of the withdrawing action, this agitation being imparted to the fused material at the interface so as to lead to an intimate weld between the two members on cooling of the joint after the withdrawal of the heater.

2. A method as claimed in claim 1 for making a joint between facing cylindrical surfaces, wherein the withdrawal of said heater is effected by a combination of angular and progressive axial movement.

3. A method as claimed in claim 1 for making a joint between facing circumferential surfaces, including the step of interposing between said surfaces a circumferential strip of mesh material cut or formed on the bias and constituting said open-work heater.

4. A jointing method as claimed in claim 1 including the step of applying heat and pressure so as to soften the material prior to the fusing step and to press the surfaces into intimate contact with the said heater.

5. A jointing method as claimed in claim 1 wherein the surfaces to be joined are pressed into intimate contact with the said heater by the application of pneumatic pressure.

6. A jointing method as claimed in claim 4 in which the softening heat is applied externally by another heater.

7. A method as claimed in claim 4 for making a joint between facing circumferential surfaces, including the step of externally wrapping on under tension a pressure applying tape of elastic material capable of withstanding the heating temperatures, the softening heat being applied round the wound-on tape externally.

8. A method as claimed in claim 4, for making a joint between facing circumferential surfaces, including the step of externally wrapping on under tension a combined heat and pressure applying means comprising a tape of elastic material capable of withstanding the heating temperatures and having secured to it a length of mesh material cut or formed on the bias and constituting a heating element used for applying the softening heat.

9. A jointing method as claimed in claim 8 in which a number of turns of the tape of predetermined overall thickness are applied before said heating element.

10. A jointing method as claimed in claim 4 in which said step of applying heat and pressure is performed using a combined heat and pressure applying means comprising a tape of elastic material capable of withstanding the heating temperatures and having secured to it a length of mesh material cut or formed on the bias and constituting a heating element.

11. A jointing method as claimed in claim 1 used in making thermoplastic cable joints.

References Cited in the file of this patent

UNITED STATES PATENTS

| | | |
|---|---|---|
| 2,293,568 | Snyder | Aug. 18, 1942 |
| 2,379,500 | Steffens | July 3, 1945 |
| 2,629,808 | Ulmschmeider | Feb. 24, 1953 |
| 2,665,738 | Caskin | Jan. 12, 1954 |
| 2,708,648 | Ulmschmeider | May 17, 1955 |
| 2,802,086 | Fener | Aug. 6, 1957 |
| 3,061,503 | Gould et al. | Oct. 30, 1962 |
| 3,071,503 | Dubois | Jan. 1, 1963 |